Sept. 16, 1941.   M. J. E. GOLAY   2,255,771
FLUID FLOW METER
Filed Jan. 27, 1937   2 Sheets-Sheet 1
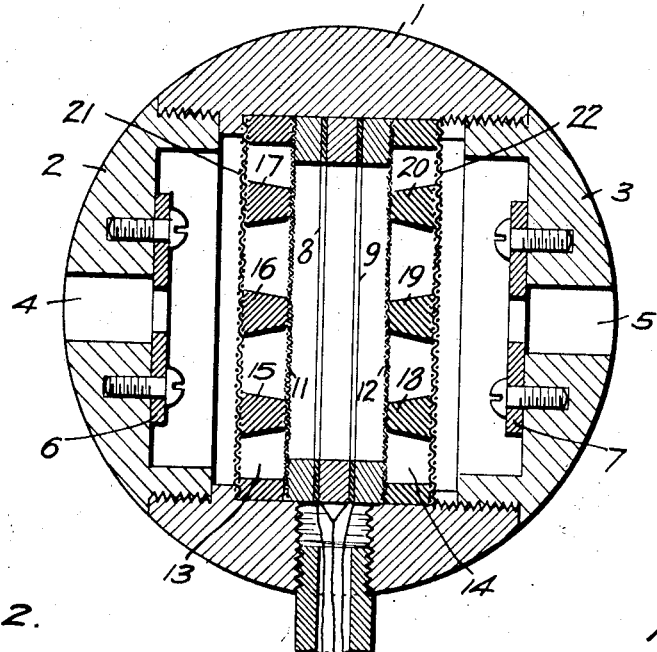
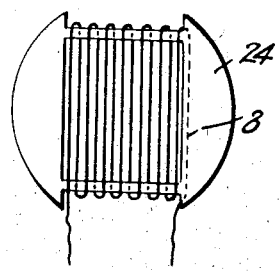
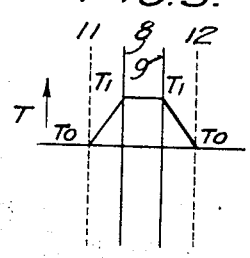
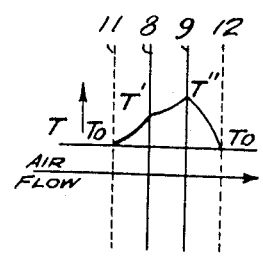
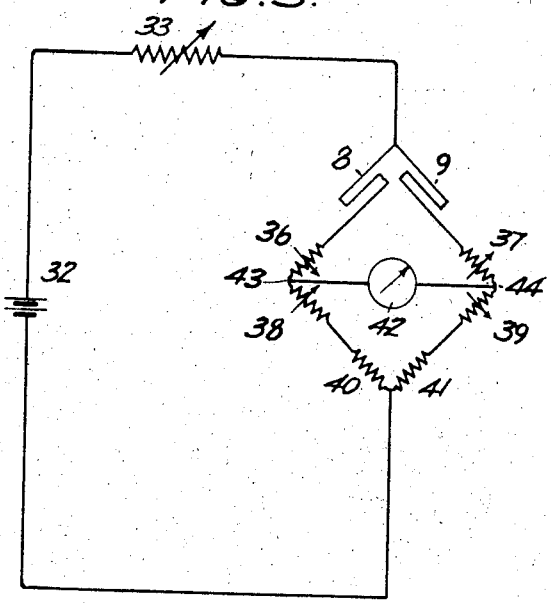
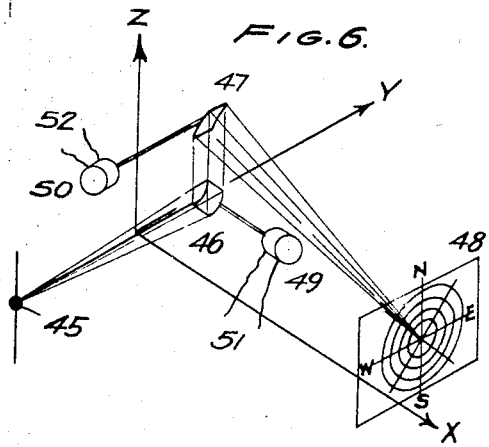
INVENTOR
MARCEL J. E. GOLAY
BY
ATTORNEYS Sept. 16, 1941.  M. J. E. GOLAY  2,255,771
FLUID FLOW METER
Filed Jan. 27, 1937  2 Sheets-Sheet 2
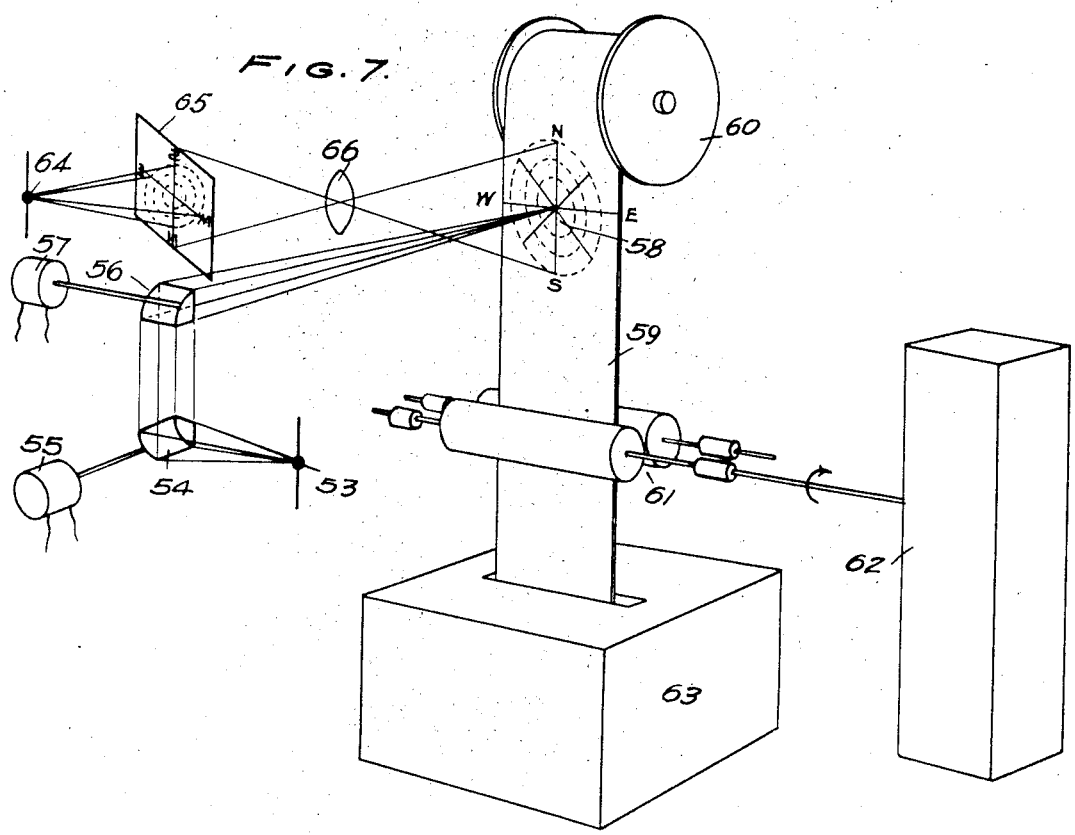
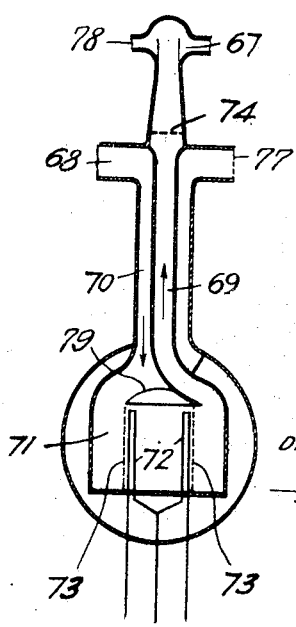
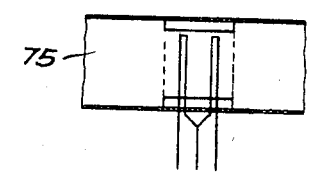
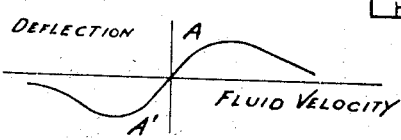
INVENTOR
MARCEL J. E. GOLAY
BY John J. Honan
Charles A. Dowe
ATTORNEYS Patented Sept. 16, 1941

2,255,771

UNITED STATES PATENT OFFICE 2,255,771

FLUID FLOW METER

Marcel J. E. Golay, Oceanport, N. J.

Application January 27, 1937, Serial No. 122,665

7 Claims. (Cl. 73—189)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to fluid-flow meters, and more particularly to a novel system of observing, measuring and recording wind velocity.

An object of this invention is to provide an anemometer which registers wind direction and velocity accurately and which responds rapidly and faithfully to changes in such factors.

Another object of this invention is to provide an anemometer in which no moving parts will be necessary, thereby eliminating the necessity for providing lubrication for such parts and the wearing out of said parts.

A further object of this invention is to provide means whereby a fluid flow causes an electrical response which bears a substantially linear relationship to the velocity of said fluid.

A still further object of the invention is to provide an anemometer which has directional characteristics, thereby enabling the measurement of the component of wind velocity, considered as a vector, in a certain direction.

An important object of the invention is to provide means whereby two or more components of wind velocity, measured by means of two or more directional anemometers, may be recomposed in a manner enabling an observer to visualize remotely and at a glance the magnitude and direction of wind in the vicinity of the anemometers, and to follow with ease the vagaries of said wind so as to form a picture of the nature of the wind existing at the time.

A still further object of the invention is to provide means whereby wind velocities existing during any period of time may be cinematographically recorded, thereby providing a record of the average wind existing during said period of time, of the number of changes occurring in wind direction and velocity during said period of time and also of the nature of the changes.

A still further object of my invention is to provide means whereby a wind of any direction will cause a unidirectional flow of air in an inclosed space containing a registering unit similar to the one used in the directional anemometer, thereby providing a non-directional anemometer having the general desirable characteristics I claim for my invention.

A still further object of my invention is to provide an optical system for the purpose of projecting onto a screen or a photographic film, a light spot movable in two dimensions, in which optical system a combination of two spherical mirrors is used in such a manner that the astigmatism of one mirror caused by non-normal incidence of the light beam is compensated by the astigmatism introduced by the other spherical mirror.

With these and other objects in mind, the invention will now be described with reference to the accompanying drawings, in which:

Fig. 1 illustrates a cross-section of the directional anemometer;

Fig. 2 illustrates a component of said anemometer;

Fig. 3 is an approximate graph of the temperatures occurring at various points of the directional anemometer when the latter is operating in still air;

Fig. 4 is an approximate graph of the temperatures occurring at various points of the directional anemometer when the latter is operating in wind;

Fig. 4a is an approximate graph of the relationship between fluid velocity and circuit response;

Fig. 5 illustrates the electrical circuit associated with the directional anemometer;

Fig. 6 illustrates means permitting visual observation of the factors measured by two direction anemometers;

Fig. 7 illustrates means for recording the factors measured by two directional anemometers;

Fig. 8 illustrates a non-directional form of anemometer;

Fig. 9 illustrates an arrangement for measuring a gaseous flow; and

Fig. 10 illustrates another arrangement for measuring a gaseous flow in a pipe.

Referring now in detail to the drawings which form a part of this specification, Fig. 1 illustrates a cross-section of a directional anemometer in which two electrically heated wires symmetrically arranged with respect to the device are used to detect a slight flow of air across them. The device as a whole has been shown as having a circular cross-section and may well be spherical, although many other shapes will also be suitable. The numeral 1 designates the central portion of the shell of the anemometer. Numerals 2 and 3 denote segments screwed into 1 and complete the outside spherical shell of the anemometer. Numerals 4 and 5 denote holes or passages through segments 2 and 3 and serve to give access to a slight flow of air through the anemometer when the instrument is placed in the wind. Numerals 6 and 7 represent two perforated partitions serving to restrict to any desired degree the flow of air through the central portion of the anemometer. Numerals 8 and 9 denote two hot-wire grids. Three leads as at 10, are connected to the ends of both hot-wire grids, one of the leads being common to one end of each grid. Shown at 11 and 12 are two fine copper wire meshes serving the double purpose of providing an outlet for the heat generated by the two wires and insuring a uniform streamlined flow of air across the two grids. Numerals 13 and 14 denote two cylindrical plates or blocks into which openings have been machined corresponding approximately to the exposed grids. Three horizontal ribs, 15, 16, 17, and 18, 19, 20, have been left in the openings of the two cylindrical blocks, respectively, for the double purpose of maintaining the wire meshes 11 and 12 as flat as possible and helping to carry away the heat of the hot-wire grids. Wire meshes 11 and 12 are made of good heat conducting material, and serve to carry away the heat of the grids 8 and 9, respectively, through ribs 15 to 17, and 18 to 20, respectively, and throughout the rest of the structure generally. Two coarser meshes, 21 and 22, have been placed across the outside ends of the two cylindrical blocks, 13 and 14, for the purpose of distributing uniformly the flow of air across the inside of the anemometer.

Fig. 2 illustrates one of the hot-wire grids 8, which may be wound around some thin insulating support 24, of the shape shown.

Referring to Figs. 3, 4 and 5, the principle of operation of the hot-wire anemometer will now be described:

Should there be no flow of air across the two hot-wire grids, which are presupposed to be as alike as possible in configuration and electrical resistance, and should electrical currents of equal magnitude flow through them, they will both be raised to a temperature T1, while the heat generated in them will flow mainly by conduction through the relatively thin sheet of air separating the grids from the fine wire meshes, which are maintained approximately at the temperature T0 of the rest of the apparatus. As illustrated by the heavy line of Fig. 3, the temperature will rise approximately linearly from the fine wire meshes, 11 and 12, to their respectively adjacent grids 8 and 9, and will be uniform between the two grids.

Now let us suppose that air flows slowly from left to right across the wire meshes and the hot-wire grids. The new temperature conditions obtaining have been illustrated by the heavy-line graph of Fig. 4. The temperature will rise approximately exponentially from wire mesh 11 which has the temperature T0 of the rest of the apparatus, to hot-wire grid 8, which has now a temperature T' lower than formerly. From grid 8 to grid 9 the temperature will rise further to the new value T''. From grid 9 the temperature decreases from T'' to T0 on wire mesh 12. Should the flow of air be from right to left, then the temperature of grid 8 would be higher than the temperature of grid 9, and it may be stated, generally, that the direction of the flow of air will determine the sign of the difference T'—T'', while the magnitude of this difference will be, for small air velocities, proportional to the average flow of air across the grids. Fig. 5 illustrates a bridge circuit which may be used to measure the temperature difference, T''—T' and, indirectly, the flow of air across the grids. Numeral 32 denotes a source of direct current, preferably a dry cell or storage battery. Numeral 33 represents a variable resistance for the purpose of regulating the amount of electrical energy fed the two hot-wire grids, 8 and 9. Numerals 36, 37, 38 and 39 denote variable resistances for the purpose of regulating the distribution of current between the two grids, and for balancing the bridge circuit for the condition of no flow of air across the grids. Numerals 40 and 41 represent two fixed resistances completing the bridge circuit. Numeral 42 is a meter means such as a galvanometer connected to the points 43 and 44 of the bridge circuit, and used for detecting and measuring the amount of unbalance due to a flow of air across the grids. Said galvanometer may of course be replaced by any other form of detecting instrument such as an ordinary milliammeter or an oscillograph unit. It will be apparent to anyone familiar with the art that the two circuits across the two hot wires may not be absolutely equal, and may also vary with the amount of air flowing across the grids, without detracting from the fact that the whole circuit may be so adjusted that the sense of the deflection of 42 will be an indication of the sense of the flow of air across the hot-wire grids, while the magnitude of said deflection will be a measure of the magnitude of this flow as well, provided the flow of air does not exceed a certain limit. Should, however, the flow of air across the grids be very rapid, it will be apparent that both grids will be cooled so as to have their temperature brought down to almost T0; that is, the temperature of the rest of the apparatus and of the ambient air, and the deflection of 42 will become small again. Fig. 4a illustrates the general character of the relationship between the air velocity across the grids and the resulting deflection of indicating instrument 42, as brought out by the foregoing discussion, and attention is called to the almost linear character of this relationship for small air velocities in either direction, exhibited by the portion A'A of the curve of Fig. 4a, which portion represents the normal working range of the double grids embodied by my invention.

If the device represented by Fig. 1 is placed in a stream of air or wind going from left to right, it is apparent that due to the increased pressure at the left of the device and the decreased pressure on the right of the device, a slight flow of air will take place within the device, from left to right. The direction of the flow will obviously be reversed if the direction of the wind is reversed. If the direction of the wind should be at a right angle to the plane used to bisect the device in Fig. 1, considerations of symmetry will indicate that no appreciable flow of air will take place within the device, and if the wind has a direction which is oblique with respect to said plane, it is apparent that a partial flow will take place within, which will be substantially the flow which corresponds to the component of wind along the common axes of openings 4 and 5.

Fig. 6 is a schematic perspective illustration of an optical system designed to combine the indications of two directional hot-wire anemometers located in the immediate vicinity of each other, and so arranged as to measure the two horizontal components of the wind in two mutually perpendicular directions. Three mutually perpendicular axes as at XYZ have been indicated in Fig. 6 to facilitate the visualization of the arrangement shown. A light beam from a source 45 proceeding horizontally in the Y direction is reflected upwards by a spherical mirror 46 onto a second spherical mirror 47, which reflects the beam of light onto a viewing screen 48. Although a certain amount of astigmatism is introduced in the system owing to the 45-degree incident and reflecting angles of the beam of light onto the spherical mirror 46, it will be apparent to anyone familiar with the art that if spherical mirror 47 has the same curvature as mirror 46, its own astigmatism due to its 45-degree angle of light incidence and reflection can compensate for the astigmatism introduced by mirror 46, and the beam of light can form a sharp image of 45 on viewing screen 48. If mirrors 46 and 47 are separated by some distance, it will be necessary in order to obtain a sharp image, that the distance from 45 to 46 be approximately the same as the distance from 47 to 48. If, however, mirrors 46 and 47 are close to each other, a sharp image may also be obtained without the above-mentioned conditions.

Mirrors 46 and 47 are mounted, respectively, on two electrical indicating instruments, 49 and 50, so designed that the passage of an electric current through them causes the mirrors to be tilted in accordance with the direction and amount of current. Instruments 49 and 50 are connected by means of leads 51 and 52 to two individual bridge circuits, not shown in Fig. 6 but similar to the one shown in Fig. 5, which are respectively associated with the two directional hot-wire anemometers located as described above in the vicinity of each other and with their axes mutually perpendicular.

It will now be apparent that the arrangement described above will cause the spot of light projected onto screen 48 to assume a position which will be a function of such factors as the direction and magnitude or velocity of the wind in the vicinity of the two anemometers. This spot of light may be considered as indicating the end of a vector representing the wind speed, the beginning of said vector being at the point occupied by the spot of light when no wind is present.

Fig. 7 illustrates diagrammatically a recording system embodying the same optical system as illustrated in Fig. 6. A point source of light 53 is first reflected by oscillating spherical mirror 54 actuated by oscillograph element 55, then reflected a second time by oscillating mirror 56 actuated by oscillograph element 57 and finally converges in a light spot 58 on photographic recording paper 59.

The film of photographic paper is unrolled from roll 60 by means of feed roller 61 which is connected to a suitable mechanism 62 which actuates the roller periodically to let a fresh length of recording paper come into the recording field. The illuminated portions of the film are stored in tank 63.

The cardinal points and other useful data are impressed on each record by means of a source of light 64, which may be controlled by feed mechanism 61, which illuminates a compass rose or other reference figure 65, an image of which is formed by transparency by means of lens 66 onto recording paper 59.

Fig. 8 illustrates an anemometer construction in which a horizontal wind of any direction will cause a flow of air across two hot-wire grids, which will depend upon the magnitude of the wind present but not upon its direction. Two openings, 67 and 68, are covered by two very fine meshes or screens 77 and 78, respectively. These mesh or screen covered openings are each cylindrically shaped and symmetrical with respect to a vertical axis, but differ from each other. Due to the high resistance offered to the passage of air by screens 77 and 78, the pressure caused by wind on the windward side of these screens, and the rarefaction caused on the leeward side will have the effect of creating an average pressure or rarefaction in the space inclosed within said screens. Furthermore, the two openings having different geometrical configuration, the average pressure of rarefaction created within said openings will be different, and the difference in pressure thus created may be utilized to cause a flow of air which will increase with wind velocity. As openings 67 and 68 are connected by channels 69 and 71 respectively to the opposite sides of a chamber 71 housing a hot-wire unit consisting of two hot-wire grids, 72, placed between two fine wire meshes 73, and connected to a bridge circuit similar to the one shown by Fig. 5, it becomes apparent that said flow of air will be caused to pass through the grids when a wind is present, and that this flow will be independent of the horizontal direction of the wind. A cover as at 79 above the grids requires that the flow be directed across the screens and the grids. A partition 74 placed in channel 69 and pierced with one or more holes serves to regulate the flow of air due to wind through the hot-wire grids.

Fig. 9 illustrates a further use of the double hot-wire grid principle, whereby a current of air, or any other gaseous substance flowing through a pipe 75, is caused to pass in its entirety through a double grid unit similar to the one described above and connected to a similar electrical circuit.

Fig. 10 illustrates a still further use of the double hot-wire grid principle whereby only part of the current flowing through a pipe 76 is diverted through a measuring double grid.

Changes, modifications and equivalent arrangements are contemplated within the scope of the invention as defined by the appended claims.

I claim:

1. In a fluid-flow meter, an electrical circuit and means in said circuit comprising thermally responsive resistance elements disposed at different points and successively across the path of flow of the fluid, said elements being arranged in planes perpendicular to the direction of said flow and adapted to vary in electrical resistance with temperature and differentially and substantially linearly in accordance with the rate of flow; and means operative with the circuit to evaluate said response in terms of velocity of said flow.

2. In a device of the character described, an electrical circuit and means operative with said circuit adapted to respond differentially to rate of flow of a gaseous fluid, said means including resistance elements successively located across the path of said flow and whose resistances vary with temperature, said elements being directly exposed to one another for heat interchange; means in the path of fluid flow to provide uniform distribution of said fluid and also acting to dissipate substantially all the heat from said resistances; and means in said circuit to evaluate the current response in terms of velocity of said fluid.

3. In a fluid flow device of the character described, which employs an electrical circuit; means operative with said circuit including resistance elements positioned successively across the path of fluid flow, being directly exposed to one another for heat interchange and whose electrical resistances vary with their temperatures and differentially in response to rate of flow; means associated with said elements to control the fluid flow, said last named means including a plurality of screens made of heat-conducting material and also functioning to dissipate all the heat from said resistance elements; and means comprising a flow passage through which the fluid is caused to flow at an average velocity which bears a functional relation to the rate of said flow and irrespective of its direction externally of said passage; and means in said circuit adapted to evaluate the current response in terms of rate of fluid flow.

4. In an apparatus for indicating fluid flow which utilizes at least two operatively associated anemometers, each of said anemometers being adapted to indicate the magnitude and sense of the component fluid velocity along an axis which is determined by the position of the anemometer; an optical system comprising a visualizing element and including means to project a spot of light onto said element; and means responsive to the fluid flow indications of each of said anemometers and coordinated to control the movement of said spot of light whereby said spot will move upon said element in a functional relation to the indications of said anemometers.

5. In a system of observing the direction and velocity of wind, which employs at least two operatively associated anemometers, said anemometers being positioned to respond to two horizontal wind components; an optical system comprising a visualizing surface and means to project a spot of spherical light on said surface, said means including a pair of spherically curved optical elements so related to one another in respect to the angles of incidence and reflection of light as to compensate for astigmatism; and means responsive to the fluid-flow indications of said anemometers and coordinated to control the movement of said elements whereby said spot of light will move upon said surface in a direct functional relation to the indications of said anemometers.

6. In an apparatus for indicating direction and velocity of wind, which employs at least two operatively associated anemometers, each of said anemometers being directional and responsive in sense and amplitude to the component of wind in the direction by which it is characterized; an optical system comprising a visualizing surface and means to project a spot of light onto said surface and including means to project an image on the same surface to function as a reference image; and means responsive to the wind flow indications of said anemometers and coordinated with said optical system to control the movement of said spot of light whereby said spot will move upon said surface in proper correlation to the reference image in a direct functional relation to the indications of said anemometers.

7. In a device of the character described, an electrical circuit and means in said circuit adapted to respond differentially to rate of flow of a gaseous fluid, said means including resistance elements between which heat may flow by convection and conduction, and whose electrical resistances vary with temperature; means including screens of heat conducting material adjacent to said resistance elements to dissipate all the heat liberated by said elements; means to cause a portion of the flow stream to move through said elements at an average rate which bears a functional relation to the actual velocity of the main stream and irrespective of its horizontal direction, said last named means including a main inlet passage and a separate outlet passage, both of said passages being adapted to operate under the influence of the main stream of the fluid medium.

MARCEL J. E. GOLAY.